United States Patent
Wentz et al.

[11] 3,982,625
[45] Sept. 28, 1976

[54] SORTER INDUCTION SYSTEM

[75] Inventors: Edward A. Wentz, Gaithersburg; Wayne Douglas Pyles, Frederick, both of Md.

[73] Assignee: American Chain & Cable Company, Inc., Bridgeport, Conn.

[22] Filed: Jan. 30, 1973

[21] Appl. No.: 328,020

Related U.S. Application Data

[63] Continuation of Ser. No. 69,404, Sept. 3, 1971, abandoned.

[52] U.S. Cl. .............................. 198/572; 198/578; 198/577; 198/587
[51] Int. Cl. ........................................... B65g 37/00
[58] Field of Search .................. 198/20, 76, 86, 95, 198/36, 20 R, 40, 31 AC, 21, 34

[56] References Cited
UNITED STATES PATENTS

| | | | |
|---|---|---|---|
| 1,507,301 | 9/1924 | Williams | 198/31 AC |
| 2,633,224 | 3/1953 | Thebault | 198/31 AC |
| 3,055,481 | 9/1962 | Austin | 198/40 |
| 3,140,771 | 7/1964 | Harrison et al. | 198/76 |
| 3,256,863 | 6/1966 | Patz | 198/86 |
| 3,481,465 | 12/1969 | Way | 193/35 R |
| 3,509,985 | 5/1970 | Fischer | 198/36 |
| 3,621,981 | 11/1971 | Nimmo et al. | 198/40 |
| 3,687,267 | 8/1972 | De Witt et al. | 198/40 |

*Primary Examiner*—Evon C. Blunk
*Assistant Examiner*—Joseph E. Valenza

[57] ABSTRACT

A sorter system for articles such as baggage, mail bags, cartons, and the like is provided which combines a high speed main or sorting conveyor and a feed or induction conveyor, or a plurality of such induction conveyors along the length of the main conveyor. The induction conveyors are for the purpose of loading the main conveyor by depositing articles thereon with a velocity imparted to the articles in the direction of movement of the main conveyor which is substantially equal to the high rate of main conveyor velocity thereby avoiding shock. The arrangement is such that articles having length and width are deposited on an induction conveyor to travel in the direction of their length and be deposited on the main conveyor transversely of the motion thereof and thus oriented widthwise on the main conveyor to reduce the area required per article on the main conveyor. As articles enter an induction conveyor an operator at a keyboard codes a computer memory in accordance with destination tags or other information on specific articles and such coding controls the discharge of articles at predetermined points along the main conveyor in accordance with conventional practice.

16 Claims, 12 Drawing Figures

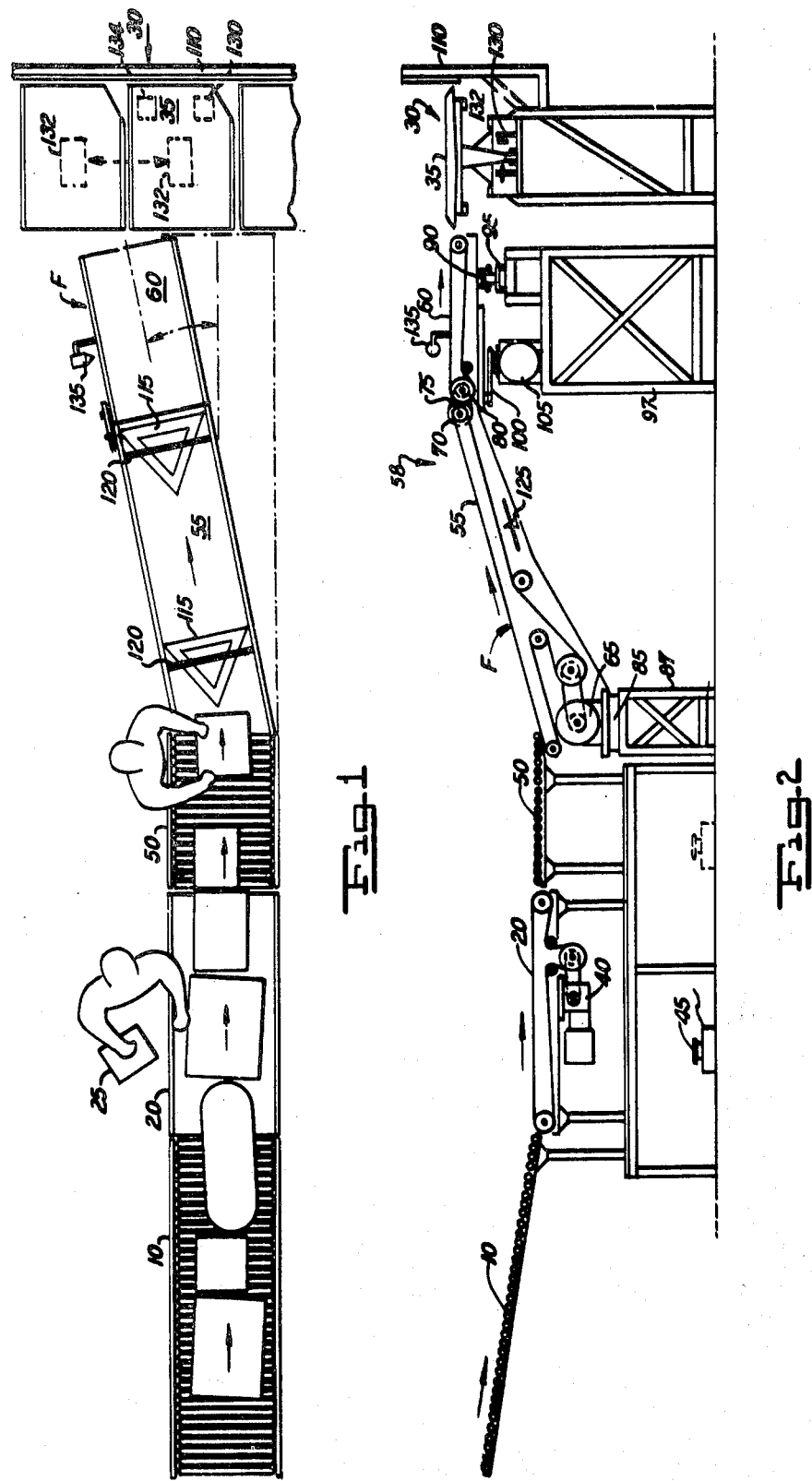

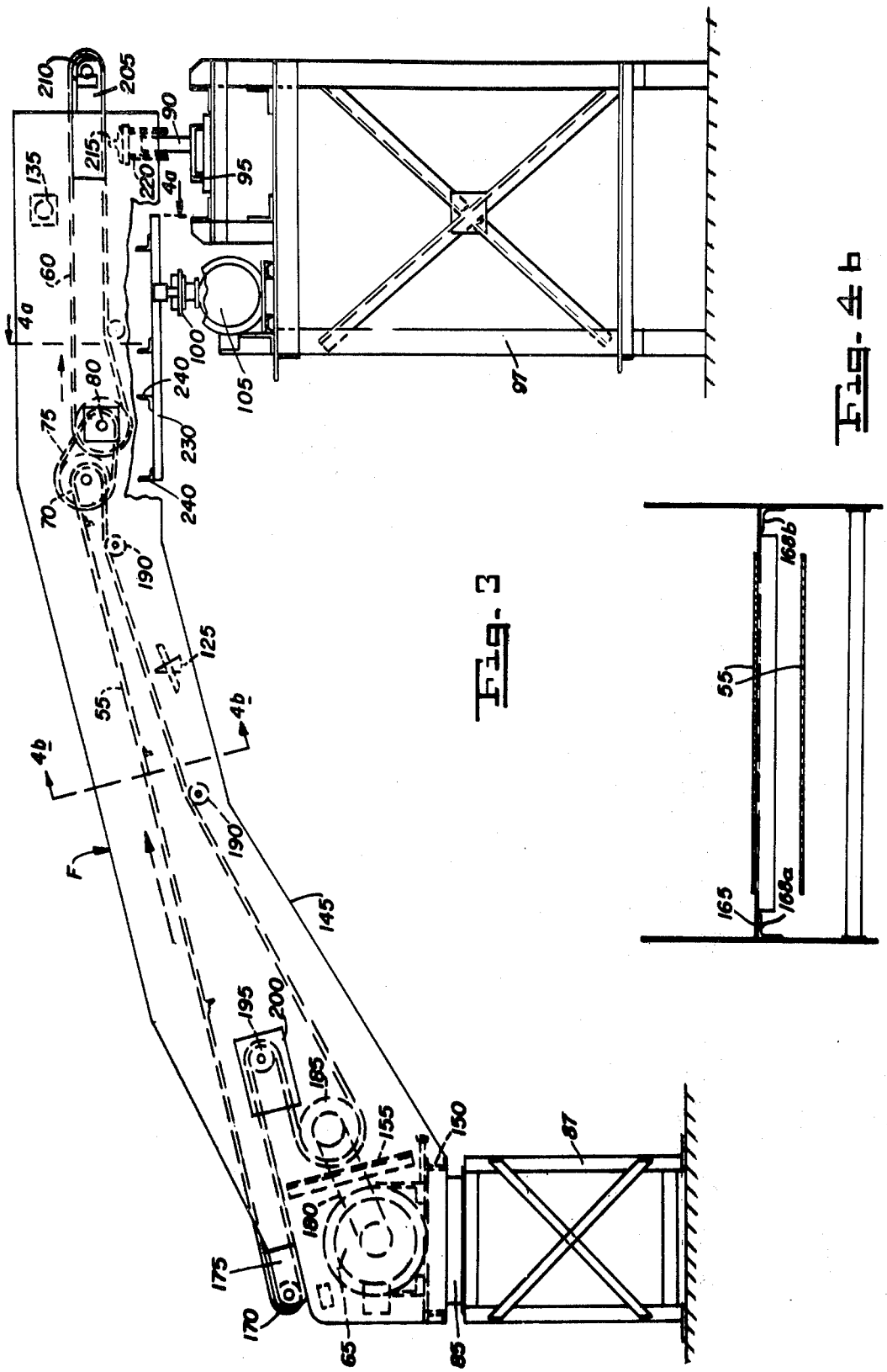

SORTER INDUCTION SYSTEM

This is a continuation of application Ser. No. 69,409, filed Sept. 3, 1970 now abandoned.

The system is well suited for use at airports where passenger traffic can vary widely at different times of the day or on different days. With the use of a single conventional keyboard and computer programming system either one or two operators can effect article, e.g., baggage loading of a main conveyor at a particular induction conveyor point, including heavy mail sacks.

The overall induction conveyor system comprises a series of conveyors arranged generally perpendicular to the main conveyor comprising a series of spaced trays. The series of conveyors has an initial gravity roller conveyor on which baggage is placed by any instrumentality, to be forwarded to a power driven conveyor intermittently operable at the will of an operator, on which power driven, or "inching" conveyor, articles rest while the conveyor is stationary and the operator codes in the article destination via a keyboard. Dependent upon quantity of articles being handled and difficulty of tag identification the power conveyor can be stopped for reading destinations. After coding on the inching conveyor the articles move to a dead roller conveyor, where several such articles may accumulate, and then each article is manually pushed to an induction conveyor comprising a loading belt, having loading areas, each area being demarcated for holding an individual article. The induction conveyor also comprises a final higher speed conveyor, a so-called "spitter" belt which moves articles onto the main conveyor. A particularly novel feature resides in combining the loading belt and spitter belt into an induction conveyor assembly that is pivotally mounted and powered to swing or oscillate so that when an article is to be deposited from the spitter belt onto a tray of the main conveyor the spitter belt is moving bodily in an arc so that its discharge or downstream end has substantially the same speed and direction as the main conveyor at the time the article is transferred from the spitter belt to the main conveyor. Such arc is of the order of 10 degrees so that transfer takes place very rapidly.

Suitable sensor means are provided for proper timing of the swinging motion of the induction conveyor with a passing tray, the induction conveyor being normally at rest at a small angle to the main conveyor direction in readiness to be swung arcuately in the direction of movement of the main conveyor for loading an article on that tray during the swinging movement. Additional sensor means provides synchronization between the induction conveyor loading belt areas and the main conveyor tray travel to ensure that articles are deposited in trays within an allotted space of time in the course of arcuate travel of the induction conveyor. Finally, suitable nominal speed control of the induction conveyor dependent on main conveyor speed is provided so that articles can be transferred while the main conveyor is changing speed, e.g., due to slowing down to come to a stop.

A detailed description of the invention now follows in conjunction with the appended drawing in which:

FIG. 1 is a plan view illustrative of the overall induction conveyor system in combination with a main or sorting conveyor;

FIG. 2 is an elevation of the arrangement of conveyors shown in FIG. 1;

FIG. 3 is an elevation showing an arrangement of an induction conveyor constructed in accordance with the invention;

FIG. 4B is a section through 4B—4B of FIG. 3;

FIG. 7A is a plan view of the underside of the inching conveyor arrangement;

Figure 4A:
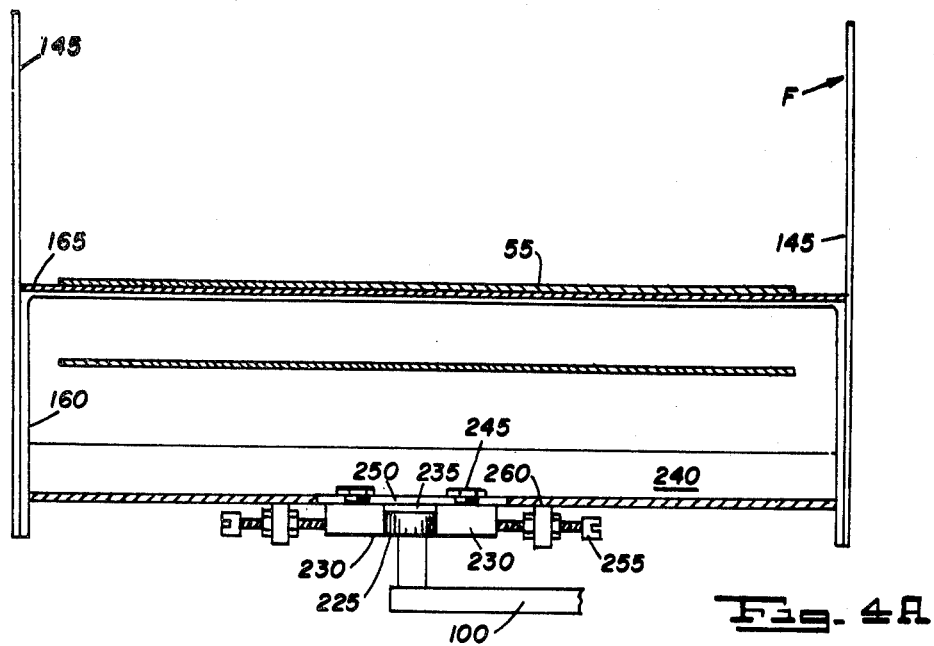
FIG. 4A is a section through 4A—4A of FIG. 3.

Referring to FIGS. 1 and 2, an inclined gravity roller conveyor 10 is provided which will be understood to be suitably supported to receive articles such as baggage, mail, sacks, or parcels, moving lengthwise to an inching conveyor 20 where an operator examines tags or identification and codes the keyboard 25 so as to program the computer control discharge system of a main sorter conveyor 30 comprising sorter trays 35 to divert items at particular stations along the travel of the main conveyor. Such systems utilizing continuously moving trays for receiving cargo which slide off the trays upon tray tilting in one direction or the other at particular cargo unloading points are very well known and the computer and programming system need not be explained in detail here since it does not form any part of the invention. However, suitable means are provided to hold a coding in a register until the coded article passes to a tray on the main conveyor.

The inching conveyor 20 is powered by a standard arrangement of motor, clutch-brake and gear reducer 40 under control of a foot switch 45 as seen in FIG. 2. The coding operator can stop and start the belt 20 by means of foot switch 45 in order to give him time to read tag identification for as long or short a period as necessary. In any event, he controls the inching belt and codes destinations, and coded articles are then transferred to a dead roller accumulator conveyor 50 where another operator manually pushes each article onto the loading belt 55 of an induction conveyor 58 which comprises a tandem assembly in a frame carrier F of a loading belt 55 and a spitter belt 60 which feeds the main conveyor 30. Articles thus pass from the gravity conveyor 10, to the inching conveyor 20, to the accumulator roller conveyor 50, to the loading belt 55 and spitter belt 60, and finally to a passing tray 35 of the main conveyor from the discharge or downstream end of spitter belt 60.

The movement of an article from the induction conveyor to a tray 35 must be accomplished in a synchronized manner so that each such article will be lodged on a tray, and further, so that regardless of whatever delays may be caused by human operation at the coding and loading stations, such tray will discharge at the proper discharge point. Further, articles must be deposited on trays with as little difference in velocity as possible in the direction of movement of the main conveyor 30.

In order to bring about these functions, the induction conveyor consisting of the belts 55 and 60 are made as an integral tandem unit wherein the belt 55 is driven by a variable speed motor 65 and power take-off at the downstream roller 70 is effected by a chain 75 to the upstream roller 80 of the spitter belt. The spitter belt moves at a substantially higher speed than the loading belt and both belts are carried on suitable rollers in a support frame F which also carries motor 65.

Motor 65 is variable in speed in response to the speed of the conveyor 30 and the relatively high speed of spitter belt 60 is provided so that an article will pass therefrom to conveyor 30 in the brief time that a tray 35 is passing the discharge end of belt 60 so as to receive thereby.

The frame F is pivoted at one end on a bearing 85 suitably supported on a structural frame 87 as illustrated. At the downstream end of the frame F rollers 90 are provided which ride on suitable track means 95 for support, on structural frame 97.

The frame F is coupled to a rotating crank arm 100 driven by a constant speed motor 105 and thus the induction conveyor oscillates from the position shown in full lines in FIG. 1 to the position shown in dash lines. Articles are discharged during the arc of swing in the direction of movement of main conveyor 30, such arc being of small range, 9° to 12°, and approximating tangency for its length of swing. The rate of rotation of arm 100 is such that the linear swing velocity at the discharge end of belt 60 is approximately the same as the velocity of main conveyor 30 at the time an article is being transferred by belt 60 to a tray, so that there is little difference, or no significant difference, in the directional velocity of such an article relative to the direction of movement of belt 30. A suitable back stop 110 is utilized to ensure against articles overriding trays when transferred thereto by belt 60.

The frame F has simple harmonic motion effected by arm 100 driving the frame via a guide slot device carried by the frame, as later explained.

One factor in the synchronization of movement of articles with that of main conveyor 30 is the proper placing of articles on the loading belt 55 and this is accomplished by having the loading operator push articles from the roller conveyor 50 on to belt 55 on particular demarcated areas occurring between triangles 115 painted or otherwise graphically arranged on belt 60. Thus, the loading operator pushes each article in turn on to belt 55 when he sees a clear area between triangles. Normally, and as a matter of practice, a loading belt such as 55 would have four loading areas, each area being a section of which the belt was constructed. Also, the belt would have certain demarcations, for example, splices 120 which hold the belt sections together, equally spaced to serve as signals or flags detected by sensors, for control purposes as subsequently explained, there being an equal number of loading areas or belt sections and splices which are of ferrous material.

While two operators are shown in FIG. 1, it will be noted that this is for peak load operation wherein the coding operator would be in control of the foot switch for the inching conveyor 20. However, during off peak periods, only a single operator would be necessary and for that purpose the operator would stand at the loading station at conveyor 50 and the keyboard and foot switch, being connected by flexible cables to the components controlled thereby, can be shifted to a convenient position adjacent conveyor 50. Thus, a single operator would then do the coding as well as the manual delivery of articles from conveyor 50 to the loading belt 55.

It is, of course, essential that there be synchronization between the movement of the trays and the induction conveyor and such synchronization is brought about by sensors such as 125 and 130 wherein proximity sensor 125 senses each passing ferrous splice and the photoelectric sensor 130 senses passage of trays 35, e.g., support 132, or the like.

Suitable circuitry is provided so that the timing of the signals from the sensors is compared and unless a certain synchronization in sensing the splices and the position of the trays passing the loading are of the induction conveyor is effected, speed of the variable speed motor 65 is automatically varied to make certain of proper registration of trays with the arc of movement of the downstream end of belt 60.

A photoelectric cell sensor arrangement 135 is provided which senses articles on spitter belt 60 and the combined signals from photoelectric sensors 134 and 135 are required to energize motor clutch-brake 105, the induction conveyor being normally in the rest position at a slight angle to conveyor 30, as shown in FIG. 1. Deenergization of motor clutch-brake 105 is accomplished by a limit switch engaged by crank arm 100, as will be subsequently explained.

From the above description it will be apparent that the present system permits an operator such time as he may need to read and code articles passing before him under control of foot switch 45. Thus, where destination tags are readily readable considerable speed is possible, faster than the systems wherein a fixed interval of time elapses for reading and coding. On the other hand, where reading of tags is difficult, the operator may take more time to do so and thus reduce the degree of miscoding which occurs with conventional systems where the fixed interval of time permitted may be insufficient. Accordingly, since miscoded articles require recirculation which causes delays and confusion, the present system avoids such drawbacks by reducing incidence of miscoding.

FIG. 1 and 2 show a generalized construction differing in non-essential details from FIGS. 3 and 4. However, referring to FIGS. 3 and 4a, 4b (using like reference numerals for the same parts) a more detailed view of an induction conveyor as to fundamental components shows the frame F as a pair of parallel sidewall members 145 in a box-like construction having a base frame 150 of angle iron or other suitable construction on which is mounted the variable speed motor 65 and which base frame is carried on bearing 85. Other spacers and rigidifying angle iron structure between the sidewalls will be understood to be present, e.g., as indicated at 155, and in particular an inverted channel 160

(FIG. 4a) may extend substantially the length of the sidewalls adjacent spitter belt 60, or to such extent as required to effect a base for a slide plate 165 on which the belt is slidably supported in order to sustain loads placed thereon. Belt 55 has a similar slide plate 168, FIG. 4b. Since slide plates are all conventional construction, details are not necessary, although support angles 168a and 168b on the sidewalls are shown.

The general belt support construction of the induction conveyor is fairly conventional, including the mode in which belt 55 is carried as by an outrigger upstream roller 170 supported between outrigger arms such as 175 carried by respective sidewalls. The belt is driven by variable speed motor 65 via chain drive 180 to drive roller 185 and makes a continuous circuit to the downstream roller 70, being supported on its lower flight by idler rollers such as 190, including a tensioning roller 195 in a loop of the belt adjustable as by a tensioning mechanism 200 all in a conventional manner heretofore long known for conveyor belts.

The downstream roller 70, as heretofore explained, drives the upstream roller 80 of the spitter belt 60 via chain 75 at about 2.5 times the linear speed of belt 55. The downstream end of belt 60 has a similar outrigger support arm 205 arrangement for roller 210. Any suitable tensioning means for the spitter belt (not shown) may be provided.

Thus, an induction conveyor may be constructed utilizing belts such as 55 and 60 supported and tensioned along conventional structural lines but arranged in tandem in a frame or any other equivalent structure so that the entire induction conveyor can swing on bearing 85 as an integral unit with the loading belt driving the spitter belt at a higher linear speed. To support the downstream end of the induction conveyor a bar means indicated at 215 extends between the sidewalls from which bar means wheel carrying flanges 220 depend for carrying a pair of wheels such as 90 heretofore described that roll on the webs of channel members 95 (see FIG. 5) as the frame F swings to and fro as indicated on FIG. 1.

Figures 5, 6:
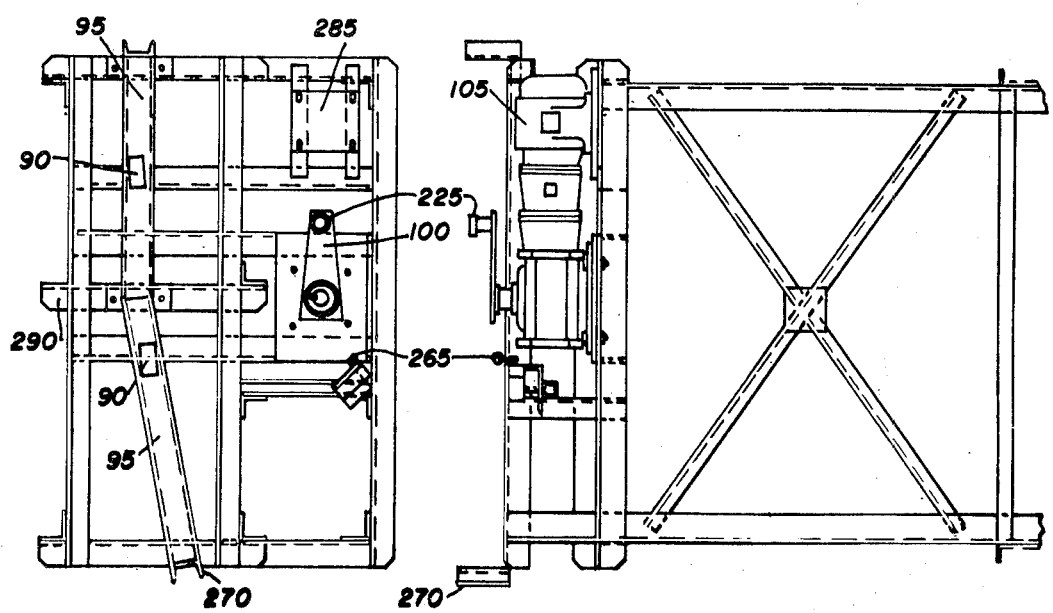
FIG. 5 is a plan view of the supporting frame structure for the downstream end of the induction conveyor showing the crank arm for oscillating the induction conveyor and the tracks for supporting the rollers at the downstream end of that conveyor.
FIG. 6 is a side view of the frame structure and the crank arm together with the motor, clutch-brake and gear reducer

The actuation for effecting the swinging or oscillation of the frame F is effected, as heretofore mentioned by the crank arm 100 rotated by the constant speed motor, clutch-brake and gear reducer 105 and reference is now made to FIGS. 4a, 5 and 6 showing various views of the crank arm 100 which has an upstanding crank pin and roller 225 disposed intermediate a pair of guide bars 230 spaced to form a guide slot 235. The bars 230 are carried by a plurality of angle irons 240 (FIG. 3) secured between the flanges of the inverted channel 160. The slot 235 between the guide bars is precisely adjustable as to width by providing for adjustability and precise parallelism of the guide bars. Thus, each guide bar is suspended as by a bolt 245 passing through a slot 250 in the respective angle iron 240 and sidewise adjustment is provided by a series of screws such as 255 carried on the bottom flanges of certain, e.g., the outermost, angle irons 240. Four screws are contemplated for each bar. Each screw 255 may be carried in a nut collar such as 260 secured to the bottom of the respective angle iron to move the bars to precisely adjusted positions whence screws 245 may be tightened. Various other expedients for adjustment of slot 235 may be provided, of course.

A limit switch 265 is provided on frame 97 in the path of movement of crank arm 100 for the purpose of deenergizing motor clutch-brake 105 at the end of a traverse, as explained in more detail later.

At the ends of the tracks 95 short upright pieces of angle iron 270 may be provided to serve as stops for the sidewalls of frame F in the event of accident to the crank arm and guide slot arrangement.

The overall constructional details are of very conventional nature, thus the frames 87 and 97 are of angle iron suitably cross braced and as seen in FIG. 5, a bed 285 for motor 105 is provided together with an angle iron support 290 for the abutting ends of the channel tracks 95 which are set at a slight angle, as shown, due to the arcuate swing of the induction conveyor. Such swing however, being very limited, 11° 30' in an actual conveyor system, the area of the webs of channels 95 is sufficient to provide surface for rolling of wheels 90 which are in a common vertical plane and are not castered.

Figure 7:
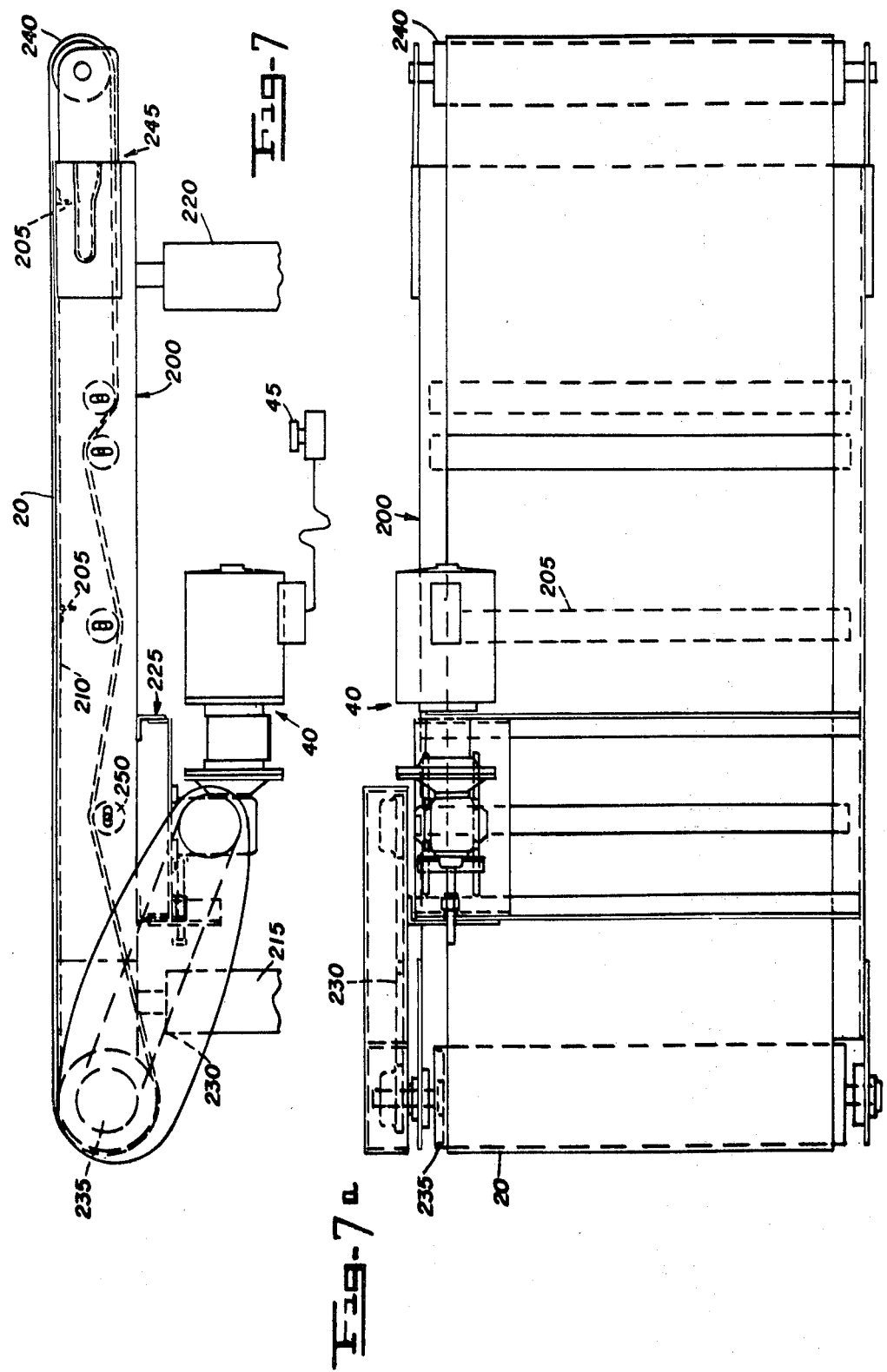
FIG. 7 is an elevation showing an inching conveyor.
Figure 8:
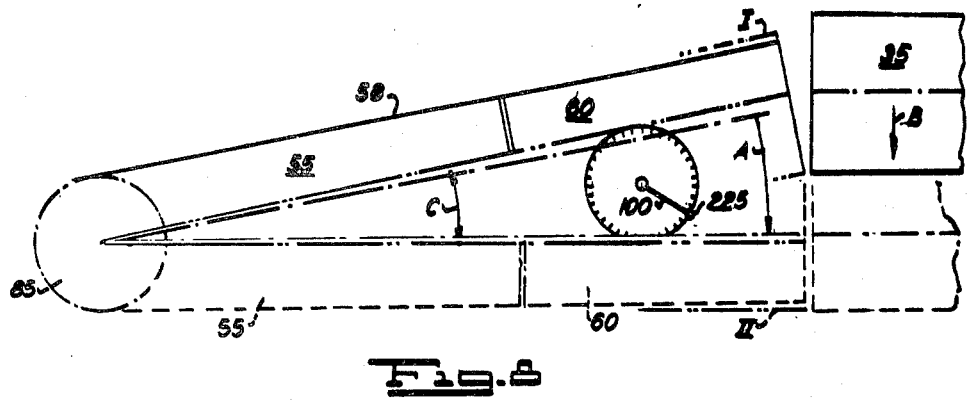
FIG. 8 is a motion diagram of the relative movement between the induction conveyor and a tray of a sorting conveyor in effecting article transfer during the arc of traverse of the induction conveyor.

Referring to FIGS. 7 and 8, the inching conveyor 20 is shown as to essential components and may be constructed along generally conventional lines and comprises the box frame 200 somewhat similar to the frame F of the induction conveyor. Spacers and structural members such as the angle irons 205 are provided which support a suitable slide plate 210 on which rests the upper flight of belt 20. The frame is supported on standards 215 and 220 and carried below the frame 200 is an angle iron frame 225 which carries the motor, and clutch-brake arrangement 40 all as a unit connected via a drive chain 230, to the downstream roller 235 of belt 20. The belt makes a continuous loop around the upstream roller 240 is mounted on an outrigger construction having tensioning adjustment means and generally indicated at 245. Additional support rollers, which may be tensioning rollers such as 250 are also included spanning the sides of frame 200. As heretofore mentioned, the foot switch 45 controls starting and stopping of the drive for belt 20 to roller 235 via the clutch-brake arrangement, the motor running continuously. Thus the movement of belt 20 is entirely under control of an operator. Although only the essential components of the inching conveyor have been illustrated, it will be understood that structural details are not necessary since inching conveyors have heretofore been known and the illustration shows the general arrangement of one such type usable in the present invention.

FIG. 8 shows diagrammatically the alignment relationship between the induction conveyor 58 and a tray 35, fragmentarily illustrated. Thus, the solid line portion of the induction conveyor is depicted as moving through an arc during article transfer represented by the arrow A, the phantom lines indicating the center line swing of the induction conveyor while a tray 35 is moving in the direction of the arrow B. The bearing 85 is illustrated by the phantom circle and as previously explained supports the upstream end of the induction conveyor for pivotal movement.

The actual stationary or rest position of the induction conveyor is indicated by line I and the final position at time of reversing movement by line II. The motion of the induction conveyor in arcuate traverse from the solid line to the dash line position is the traverse during the course of transfer of an article from spitter belt 60 to tray 35. Thus, the article begins to leave the spitter belt to enter on the tray 35 when the spitter belt is in the solid line position and has completed transfer at the dashed line position. The total arcuate travel from rest position I to the position II at which reversal takes place to complete and oscillation is a matter of 11° 30′. Arm 100 rotates through an arc of 120° for that portion of the total swing during which transfer takes place, and such arcuate traverse of the induction conveyor is of the order of 9° 30′. The amount of rotation for total travel of the induction conveyor is indicated by the arrow C. The over-travel is provided to compensate for inertia effects in starting and reversing the induction conveyor. Of course, these values may be varied, but one given as exemplary of an actual system in which the main conveyor moves at a speed of five feet per second and the spitter belt moves at a speed of 8.33 feet per second. The time duration of article transfer is one half second.

Figure 9:
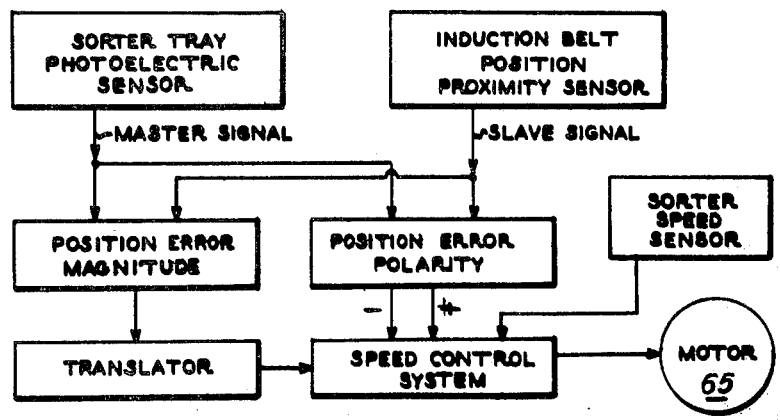
FIG. 9 is a block diagram of the synchronization system circuitry which effects control of the linear speed of the induction conveyor responsive to the position of sorter trays moving therepast so as to assure synchronization of a moving sorter tray with the loading areas on the induction conveyor.

Referring to FIG. 9, the block diagram shows one system for synchronizing the speed of the induction conveyor with the speed of the main conveyor, such synchronization actually being by sensing the passage of discrete areas of the loading belt 55 of the moving induction conveyor and the trays 35 of the main conveyor. Thus, signal or flag means are provided to be detected by sensors which effect pulses that are compared on a time base to determine whether or not the induction conveyor is running fast or slow with respect to the main conveyor. Such a system is particularly advantageous because it effects synchronization of the transfer movement of individual articles onto individual trays in leaving the spitter belt 60.

There is a synchronization of each tray past the discharge end of the spitter belt with any initiated unloading swing of that belt so that by proper speed of the spitter belt the time required for transfer of an article onto a tray is within the limits allowed for complete and accurate placing of an individual article on a tray.

In FIG. 9 the proximity sensor 125 and photoelectric sensor 130 are shown and reference is made to FIGS. 1 and 2 for the general locations of these sensors. The induction conveyor proximity sensor 125 sends pulses by detection of the equally spaced ferrous belt splices 120. Sensor 130 detects the support posts or yokes 132 of the trays 35, or for that matter any equally spaced signal or flag means which may be applied to any kind of main conveyor, e.g., tray type or having other type of load receiving means. Each post 132 causes a pulse to be transmitted to circuitry which compares such pulses with pulses from sensor 125 to ascertain relative position, ahead or behind, of the induction conveyor. Both pulse trains also go to circuitry which indicates the magnitude of difference between proper position and actual position. Such circuitry components are indentified on FIG. 9 as "position error polarity" and "position error magnitude." These are conventional timing circuitry components wherein the control pulses from the main conveyor are used as a reference for the follower pulses from the proximity sensor for the purpose of indicating whether the induction conveyor is running ahead or behind with respect to the main conveyor position. By the same token, the control pulses are used as a reference for comparison with the follower pulses to indicate the magnitude of deviation. If such magnitude deviates beyond any predetermined allowable limit, a pulse is received at the "translator" from the "position error magnitude" circuitry. The translator is basically a computer and of conventional arrangement which converts the magnitude pulse to a percentage change in speed of the inducton conveyor motor 65 for a predetermined period of time. For example, if the magnitude pulse lasts for one second it would cause a 5% speed change for 4 seconds. The figures just given are purely hypothetical for illustration, but such speed change control, voltage or current, identified as the "linear correction signal" passes to the "speed control system" which also receives signals from the polarity circuitry component to effect the change as faster or slower. The speed control system is a commercially obtainable component, for example, a product of Eaton, Yale and Towne Co., USA, sold under the trademark DYNAHERTZ, type DHZ-2400MT. The component is referred to in the trade as a static adjustable frequency control and is commonly used to control the speed of synchronous induction motors such as the induction conveyor motor 65. Motors of that type are controlled by changing input frequency. However, other equivalent systems use D.C. motors and, of course, a different type of control, but usable for the purpose of the invention.

In addition to control signals for polarity and magnitude, the speed control system also receives a signal from a digital tachometer coupled to the main conveyor and designated as "sorter speed sensor". This provides nominal speed of the induction conveyor as determined by the speed of the main conveyor.

All components described in FIG. 9 may be constructed by persons skilled in the art on the basis of well-known logic circuitry where otherwise not directly obtainable as a commercial product and, accordingly, schematic diagrams are not necessary for further explanation.

Figure 10:
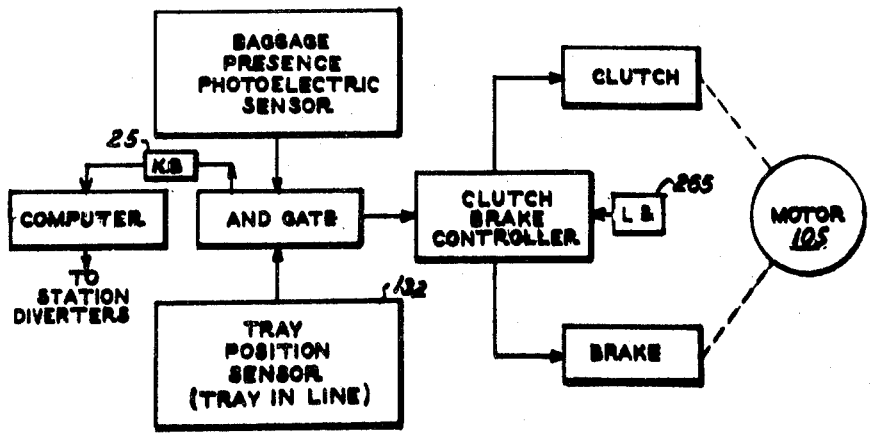
FIG. 10 is a block diagram of the circuitry controlling the motor for swinging the induction conveyor responsive to being conditioned by the functioning of the tray and induction conveyor synchronizing system, wherein an oscillatory cycle is initiated upon the sensing of an article moving on the spitter belt.

Referring to FIG. 10, the block diagram illustrates the oscillation control for the induction conveyor which is very simple in concept, comprising a photoelectric sensor 134 similar to sensor 130 (see FIG. 1) which likewise senses the supports 132 of the trays or for that matter any other equally spaced flag or signal means on any other type of main conveyor. The photoelectrical sensor 135 detects passage of an article going from the induction conveyor to the main conveyor, that is an article furthest downstream on loading belt 55 advancing toward the spitter belt 60 which receives and transfers one article at a time. The pulses of sensors 130 and 134 feed to an "and gate" whereby the combined signals feed to the "clutch-brake controller" to energize the clutch of the motor combination 105, to oscillate the induction conveyor. The brake is in engaged condition until a signal is received from the and gate, the brake is then released and the clutch energized whence the induction conveyor commences to swing from position I to position II, FIG. 8. Thus, the sensors synchronize the article transfer swing motion of the induction conveyor with a passing tray 35, virtually a tangential relationship between the discharge end of spitter belt 60 during the allotted time of transfer, at laest for all partical purposes.

In order to restrict the induction conveyor to a single oscillation, the limit switch 265 (FIGS. 5 and 6) is arranged in the path of movement of arm 100, the switch being normally closed but opened when engaged by the arm, thus breaking the sealing contact of a relay (not shown) which is part of the clutch-brake controller system, all of conventional circuitry, whence the clutch is deenergized and the brake applied. While it is contemplated that the motor and clutch-brake arrangement 105 is of the magnetic type, it will, of course, be appreciated that any equivalent kind could be used, for example, hydraulically actuated. The momentum of the induction conveyor system is such that after momentarily opening limit switch 265 it coasts to a rest position generally indicated at I in FIG. 8 in readiness for another cycle to be initiated upon coincidence of signals from sensors 130 and 134.

A convenient means of synchronizing the programming control with diverter stations along the length of the main conveyor is simply by coupling the and gate to the computer being programmed by the keyboard 25, FIG. 1. Thus, any article coded in a register has such coding transferred to a shift table register upon a signal being received from the and gate which of course, is dependent upon movement of an article from spitter belt 60 onto the main conveyor.

The principle of operation described above thus achieves a dual synchronization of article transfer to a high speed conveyor, one synchronization being for a component of transverse motion of the article relative the conveyor direction at a rate to ensure full transfer in a short period of time, of the order of half a second, and other synchronization being a longitudinal motion component of the article relative to conveyor direction to effect conveyor speed for the article during transfer, a matter of some 300 feet per minute effected by the swing of the induction conveyor. The linear belt speed variation of the induction conveyor effects the transverse component in dependence on variation in main conveyor speed and the angular speed of oscillation effects the longitudinal component, an approximate value, since the angular speed is constant and not controlled by speed variation of the main conveyor. The constant angular rate is, however, not significant since the speed variation in normal operation of the main conveyor is not so great as to effect proper article placement on individual trays providing the transverse component is maintained at proper speed value and the longitudinal component is initiated at a proper time which can be set for various installations by appropriate positioning of sensor 134.

The invention is not limited to the use of either a belt for a loading or moving conveyor of the induction conveyor or to the use of trays for the main conveyor. The utility of maintaining movement of individual articles from a discrete area to a discrete area permits the detection of pasage of such areas by suitable sensors whereby synchronization by comparison of pulses on a time base is achieved. In terms of motor drive means, such synchronization requires speeding up or slowing down of the induction conveyor whose nominal speed in relation to the main conveyor is maintained by the digital tachometer hereinbefore mentioned. The relationship between the loading belt and the spitter belt of the induction conveyor is, of course, such that the linear speed of the spitter belt is the speed ultimately regulated by regulation of the driving speed of the loading belt, but such discharge and linear speed of the spitter belt is always in direct proportion to speed change of the loading belt due to the sprocket chain drive from the loading belt to the spitter belt.

The invention is beleived applicable to any system where it is necessary to move articles onto a moving conveyor or onto a series of conveyances, the basic principles of synchronization taught herein being observed.

The coaction of two synchronizing systems, a synchronizing system for moving an article in the direction of a receiving medium and at the speed thereof while being transferred thereto, and the other synchronizing system for effecting the transfer in an interval of time during which the article is moving at the rate of the receiving medium is believed to have wide applicability. Such coaction of the two systems are usable not only in transfer from demarcated areas of an induction medium to demarcated areas of a receiving medium for use in a sorting arrangement but could have general purpose utility not requiring loading and receiving area units.

We claim:

1. A conveyor system comprising the combination of main conveyor and an induction conveyor for discharging articles to said main conveyor; said induction conveyor comprising a discharge end whereat articles are discharged on to said main conveyor; pivotal support means for said induction conveyor whereby said induction conveyor is free to oscillate; said induction conveyor being disposed realtive to said main conveyor so that in the course of oscillation said discharge end moves through an arc adjacent to said main conveyor to transfer articles on to said main conveyor during arcuate traverse; actuating means for effecting oscillation wherein said discharge end moves through said arc at a speed approximating the main conveyor speed so that articles discharged have an effective speed aproximating that of said main conveyor in the direction of movement thereof during transfer; said induction conveyor comprising a loading belt and a spitter belt in tandem wherein articles are loaded on said loading belt to pass to said spitter belt to be transferred to said main conveyor; said discharge end of said induction conveyor being the downstream end of said spitter belt; and means for operating said loading belt at a rate synchronized with the speed of said main conveyor, including demarcated loading areas on said loading belt for placing individual articles thereon, said areas being equal in size, including signal means carried by said loading belt demarcating said loading means; a first sensor means operative in response to passage of said signal means; said main conveyor comprising a plurality of spaced load receiving means for receiving individual articles; a second sensor means operative to signal passage of individual load receiving means; control means responsive to a time difference in the signals of said two sensor means to synchronize the position of said loading belt with the position of a load receiving means whereby articles are certain of transfer on to a load receiving means during arcuate traverse of said downstream end of said spitter belt.

2. A continuously operating conveyor system comprising:
the combination of main conveyor and an induction conveyor for discharging articles to said main conveyor;
said induction conveyor comprising a discharge end whereat articles are discharged on to said main conveyor;
pivotal support means for said induction conveyor whereby said induction conveyor is free to osciallate;
said induction conveyor being disposed relative to said main conveyor so that in the course of oscillation said discharge end moves through an arc tangentially to said main conveyor to transfer articles on to said main conveyor during arcuate traverse;
actuating means comprising a motor for effecting oscillation of said induction conveyor wherein said discharge end swings at a tangential speed approximating that of said main conveyor in the direction of movement thereof during transfer;

a variable speed motor for continurous operation of said induction conveyor in conveying articles to said main conveyor and means for correlating discrete portions of said induction conveyor on which respective articles are loaded with discrete portions of said main conveyor which receive said respective articles, said means comprising sensors effecting signal comparision to conrol the speed of said variable speed motor.

3. A continuously moving induction conveyor and a continuously moving main conveyor having discrete article receiving areas for receiving articles from said induction conveyor; said induction conveyor comprising a belt having discrete loading areas and a discharge end; pivotal support means for said induction conveyor permitting oscillation of said discharge end in an arcuate traverse relative to said main conveyor whereby in the course of oscillation said discharge end can move through an arc adjacent said main conveyor substantially tangent horizontally to the direction of movement therof; actuating means for oscillating said induction conveyor through said arc at a speed approximately the main conveyor speed so that articles discharged from said discharge end have an effective speed approximating that of said main conveyor in the direction thereof during discharge thereto, power operating means for continuous movement of said induction conveyor belt and synchronizing means for synchronizing the loading areas of said belt with the receiving areas of said main conveyor; said power operating means for said induction conveyor belt being a variable speed device and said synchronizing means being operative to vary the speed of said latter device for synchronizing the positions on the loading areas of said belt with the positions of article receiving areas of said main conveyor so that individual articles will be transferred from said induction conveyor to said main conveyor with synchronized timing from a loading area to a receiving area.

4. An induction conveyor for discharging articles to a main conveyor;

said induction conveyor having loading area means and a discharge end;

pivotal support means for said induction conveyor permitting oscillation of said discharge end in an arcuate traverse relative to said main conveyor;

whereby in the course of oscillation said discharge end can move through an arc adjacent said main conveyor substantially tangent to the direction of movement thereof;

actuating means for oscillating said induction conveyor through said arc at a speed approximately the main conveyor speed so that articles discharged from said discharge end have an effective speed approximating that of said main conveyor in the direction thereof during discharge thereto;

said loading means comprising a belt demarcated into loading areas for receiving individual articles;

said belt comprising a series or segments spliced by ferrous elements intermediate said loading areas;

means for detecting said ferrous elements;

said belt having drive and control means responsive to said detection and to coincidence therewith of a predetermined position of a discrete load receiving area of said main conveyor to regulate the speed of said belt to effect article transfer from said induction conveyor to said load receiving area while said load receiving area of said main conveyor is passing the discharge end of said induction conveyor.

5. In a conveyor system, an induction conveyor having a loading belt and a spitter belt and having means supporting said belts in tandem arrangement; and belt drive means to continuously drive said belts in a fixed speed ratio wherein the linear speed of said spitter belt is greater than that of said loading belt; oscillatory drive means for oscillation drive means for oscillation of said induction conveyor in an arcuate traverse at the discharge end of said spitter belt; a receiving conveyor arranged for movement relative to said spitter belt end to receive articles therefrom in the course of oscillation of said induction conveyor; means for synchronizing an oscillation of said induction conveyor with the presence of a discrete portion of said receiving conveyor at said end of said spitter belt; said oscillatory drive means comprising drive engaging means; and sensing means for detection of articles on said conveyor and for detecting discrete portions of said receiving conveyor; and control means connected to said drive engaging means and responsive to operation of said sensing means for article delivery from said end of said spitter belt to said discrete portions of said receiving conveyor during oscillations of said induction conveyor.

6. A conveyor system comprising an inching conveyor, an accumulator conveyor, an induction conveyor and a sorting conveyor, arranged in the sequence named, with a coding station at said inching conveyor, whereby articles are placed on said inching conveyor to be coded for programming of a computer for unloading at points along said sorting conveyor; power means for motivating said inching conveyor and manual control means for starting and stopping said inching conveyor for the time necessary for coding; wherein articles thus coded are passed by said inching conveyor to said accumulator conveyor; said accumulator conveyor being non-powered whereby articles can be manually moved therefrom to said induction conveyor; said induction conveyor having means for transferring articles to said sorting conveyor with a velocity component during the course of transfer in the direction of movement of said sorting conveyor which substantially matches the speed of said sorting conveyor; wherein said induction conveyor comprises a discharge end whereat articles are discharged therefrom to said sorting conveyor; said means for transferring articles comprising pivotal support means for said induction conveyor permitting oscillation;

said induction conveyor being disposed relative to said sorting conveyor so that in the course of oscillation said discharge end moves through an arc adjacent said sorting conveyor to discharge articles on to said sorting conveyor during arcuate traverse;

actuating and synchronizing means for effecting oscillation wherein said discharge end moves through said arc at a speed approximating the sorting conveyor speed.

7. In a conveyor system, an induction conveyor comprising belt means and supporting structure therefore and having a loading end and a discharge end; belt drive means to continuously drive said belt means; oscillatory drive means for oscillation of said induction conveyor in an accurate traverse at the discharge enf of said belt means; a receiving conveyor arranged for movement relative to said discharge end to receive articles therefrom in the course of oscillation of said induction conveyor; means for synchronizing an oscillation of said inducton conveyor with the presence of a discrete portion of said receiving conveyor at said discharge end; said oscillatory drive means comprising drive engaging means; and sensing means for detection of articles on said belt means and for detecting discrete portions of said receiving conveyor; and control means connected to said drive engaging means and responsive to operation of said sensing means for article delivery from said discharge end to said discrete portions of said receiving conveyor during oscillations of said induction conveyor.

8. An induction conveyor having a loading belt and a spitter belt, means supporting said belts in tandem arrangement and a belt drive motor means to continuously drive said belts in predetermined drive ratio; a fixed support means and a pivotal bearing support thereon connecting said induction conveyor thereto for oscillation in an arcuate traverse at the discharge end of said spitter belt; drive means comprising a motor disposed intermediate said induction conveyor and said fixed support means to oscillate said induction conveyor; including a continuously moving main conveyor in combination with said induction conveyor and arranged relative thereto so as to receive articles therefrom in the course of oscillation thereof, and means for synchronizing oscillation of said induction conveyor with presence of a discrete portion of said main conveyor; and mechanism comprising a clutch means for the respective motor of said induction conveyor to effect oscillatory motion; and a sensing means for detection of an article on said spitter belt and of a discrete portion of said main conveyor to receive an article thereon; said clutch means being responsive to combined operation of both said sensing means to effect an article delivery oscillation.

9. An induction conveyor having a loading belt and a spitter belt, means supporting said belts in tandem arrangement and a belt drive motor means to continuously drive said belt in predetermined drive ratio; a fixed support means and a pivotal bearing support thereon connecting said induction conveyor thereto for oscillation in an arcuate traverse at the discharge end of said spitter belt; drive means comprising a motor disposed intermediate said induction conveyor and said fixed support means to oscillate said induction conveyor; including a continuously moving main conveyor in combination with said induction conveyor and arranged relative thereto so as to receive articles from said spitter belt in the course of oscillation of said induction conveyor and having a plurality of discrete article receiving portions; crank mean comprising a clutch actuatable to effect an oscillation; and sensing means for detection of an article on said spitter belt and the position of a discrete portion of said main conveyor to receive an article therefrom, and control means whereby said clutch is actuated responsive to said sensing means for effecting oscillation in timed relation to said detected discrete portion of said main conveyor to deposit an article on a discrete portion of said main conveyor.

10. An induction conveyor having a loading belt and a spitter belt, means supporting said belts in tandem arrangement and a belt drive motor means to continuously drive said belts in predetermined drive ratio; a fixed support means and a pivotal bearing support thereon connecting said induction conveyor thereto for oscillation in arcuate traverse at the discharge end of said spitter belt; drive means comprising a motor disposed intermediate said induction conveyor and said fixed support means to oscillate said induction conveyor; includng a continuously moving main conveyor in combination with said induction conveyor and arranged relative thereto so as to receive articles therefrom in the course of oscillation thereof, said motor for said induction conveyor being a variable speed motor; means for controlling the speed thereof to correlate the movement of discrete portions of said loading belt with discrete portions of said main conveyor, which means comprises a system having respective sensors to detect and signal passage of discrete portions of said loading belt and discrete portions of said main conveyor, said system having means to vary the speed of said induction conveyor motor responsive to predetermined degree of difference in time of signals received from said sensors.

11. An induction conveyor having a loading belt and a spitter belt, means supporting said belts in tandem arrangement and a belt drive motor means to continuously drive said belts in predetermined drive ratio; a fixed support means and a pivotal bearing support thereon connecting said induction conveyor thereto for oscillation in an arcuate traverse at the discharge end of said spitter belt; drive means comprising a motor disposed intermediate said induction conveyor and said fixed support means to oscillate said induction conveyor; including a continuously moving main conveyor in combination with said induction conveyor and arranged relative thereto so as to receive articles therefrom in the course of oscillation thereof, and means for synchronizing oscillation with presence of a discrete portion of said main conveyor comprising a clutch means and a sensing means for detection of an article on said spitter belt and of a discrete portion of said main conveyor to receive an article therefrom, said clutch means being responsive to combined operation of both said sensing means to effect oscillation; said motor for said induction conveyor belts being a variable speed motor; and means for controlling the speed thereof to correlate the movement of discrete portions of said loading belt with discrete portions of said main conveyor, which means comprises a system having respective sensors to signal passage of discrete portions of said loading belt and of said main conveyor, said system having means to vary the speed of said induction conveyor motor responsive to a predetermined degree of difference in time of signals received from said sensors.

12. An induction conveyor for discharging articles to a main conveyor; said induction conveyor having loading area means and discharge end; pivotal support means for said induction conveyor permitting oscillation of said discharge end in an arcuate traverse relative to said main conveyor; whereby in the course of oscillation said discharge end can move through an arc adjacent said main conveyor substantially tangent to the direction of movement thereof; actuating means for oscillating said induction conveyor through said arc at a speed approximately the main conveyor speed so that articles discharged from said discharge end have an effective speed approximating that of said main conveyor in the direction during discharge thereto; said loading means comprising a belt demarcated into loading area for receiving individual articles; said belt comprising a series of segments spliced by ferrous elements intermediate said loading areas; means for detecting said ferrous elements; said belt having drive and control means responsive to said detection and to coincidence therewith of a predetermined position of a discrete load receiving area of said main conveyor to regulate the speed of said belt to effect article transfer from said induction conveyor to said load receiving area while said load receiving area of said main conveyor is passing the discharge end of said induction conveyor; including means for initiating said arcuate traverse comprising a sensor for detecting an article on said spitter belt and a sensor for detecting the presence of a load receiving area moving into position to receive said article and means for effecting a single oscillation of said induction conveyor upon substantial coincidence of said signals.

13. An induction conveyor having a loading belt and a spitter belt, means supporting said belts in tandem arrangement and a belt drive motor means to continuously drive said belts in predetermined drive ratio; a fixed support means and a pivotal bearing support thereon connecting said induction conveyor thereto to permit oscillation in an arcuate traverse at the discharge end of said spitter belt; drive means comprising a motor operatively connected to oscillate said induction conveyor; including a continuously moving main conveyor in combination with said induction conveyor and arranged relative thereto so as to receive delivery of articles therefrom in the course of an oscillation thereof, and means for synchronizing an oscillation of said induction conveyor with presence of a discrete portion of said main conveyor; and power transfer means for the respective motor of said induction conveyor to effect an oscillatory motion of said induction conveyor; and sensing means for detection of an article on said spitter belt and substantially simultaneously of a discrete portion of said main conveyor to receive an article thereon; said power transfer means being responsive to operation of said sensing means to effect an article delivery oscillation.

14. An induction conveyor for feeding discrete articles to a moving receiver in synchronization therewith, comprising a loading belt and a load discharge spitter belt and having means supporting said belts in alignment for transfer of articles from said loading belt to said spitter belt; a belt drive means connected to drive said belts in predetermined speed ratio with said spitter belt having a greater speed; bearing support means to permit oscillation of said induction conveyor in an arcuate traverse at the discharge end of said spitter belt; oscillatory drive means connected to oscillate said induction conveyor; and means for intermittent energization of said oscillatory drive means for single cycle start and stop oscillation of said induction conveyor to transfer a discrete article off said spitter belt in synchronization with a moving receiver during said single cycle of oscillation responsive to a discrete article presence on said induction conveyor.

15. A conveyor system comprising an inching conveyor, an accumulator conveyor, an induction conveyor and a sorting conveyor, arranged in the sequence named, with a coding station at said inching conveyor, whereby articles are placed on said inching conveyor to be coded for programming of a computer for unloading at points along said sorting conveyor; power means for motivating said inching conveyor and manual control means for starting and stopping said inching conveyor for the time necessary for coding; wherein articles thus coded are passed by said inching conveyor to said accumulator conveyor; said accumulator conveyor being non-powered whereby articles can be manually moved therebetween to said induction conveyor; said induction conveyor having means for transferring articles to said sorting conveyor with a velocity component during the course of transfer in the direction of movement of said sorting conveyor which substantially matches the speed of said sorting conveyor; said control means for said inching conveyor being movable to positions adjacent said accumulator conveyor whereby coding may be effected as well as manual movement of articles to said induction conveyor, said control means and said coding station being normally at said inching conveyor and said control means and said coding station being movable to respective positions adjacent said accumulator conveyor whereby coding may be effected as well as manual movement of articles to said induction conveyor at said accumulator conveyor.

16. An oscillatable induction conveyor having an upstream loading belt and a downstream spitter belt; said belts being continuously driven with said spitter belt having a fixed higher speed and disposed to receive delivery of articles from said loading belt; a carrier for said belt; a belt drive motor to continuously drive said belts; a pivotal support means for upstream support of said carrier and disposed to permit oscillation thereof in an arcuate traverse at the downstream end of said spitter belt; downstream support means for said carrier movable therewith during oscillation thereof; drive means below said carrier having means for oscillating said carrier and comprising a crank arm and motor to effect rotation of said crank arm; a pair of speed guide bars secured to said carrier, said crank arm having a member extending therebetween and engageable therewith so that a revolution of said crank arm effects an oscillation of said carrier, including means for adjustably positioning said guide bars relative to each other for precise parallelism.

* * * * *